(12) United States Patent
Jones et al.

(10) Patent No.: US 6,827,553 B2
(45) Date of Patent: Dec. 7, 2004

(54) FLEXBEAM DAMPER ASSEMBLY HAVING TRANSITION SHIM CLAMP DEVICE

(75) Inventors: Peter J. Jones, Erie, PA (US); Eric J. Seitter, Erie, PA (US)

(73) Assignee: Lord Corporation, Cary, NC (US)

( * ) Notice: Subject to any disclaimer, the term of this patent is extended or adjusted under 35 U.S.C. 154(b) by 31 days.

(21) Appl. No.: 10/342,716

(22) Filed: Jan. 15, 2003

(65) Prior Publication Data

US 2004/0136829 A1 Jul. 15, 2004

(51) Int. Cl.[7] .............................................. B64C 27/51
(52) U.S. Cl. .................. 416/106; 416/134 A; 416/140; 416/500
(58) Field of Search ......................... 416/106, 134 A, 416/140, 141, 500; 415/119

(56) References Cited

U.S. PATENT DOCUMENTS

| | | | |
|---|---|---|---|
| 3,758,230 A | | 9/1973 | Potter |
| 3,842,945 A | | 10/1974 | Potter |
| 3,920,231 A | | 11/1975 | Harrison et al. |
| 4,087,203 A | | 5/1978 | Ferris |
| 4,105,266 A | | 8/1978 | Finney |
| 4,244,677 A | * | 1/1981 | Noehren et al. ......... 416/134 A |
| 4,257,738 A | | 3/1981 | Schwarz et al. |
| 4,332,525 A | | 6/1982 | Cheney, Jr. |
| 4,466,774 A | | 8/1984 | Cycon et al. |
| 4,725,046 A | | 2/1988 | Sugino |
| 4,815,937 A | | 3/1989 | Aubry et al. |
| 4,893,988 A | | 1/1990 | Sato |
| 5,092,738 A | | 3/1992 | Byrnes et al. |
| 5,249,926 A | | 10/1993 | D'Anna et al. |
| 5,316,442 A | | 5/1994 | Mouille |
| 5,540,549 A | | 7/1996 | McGuire |
| 5,913,659 A | | 6/1999 | Doolin et al. |
| 6,045,328 A | | 4/2000 | Jones |
| 6,394,432 B1 | | 5/2002 | Whiteford |

FOREIGN PATENT DOCUMENTS

| | | |
|---|---|---|
| EP | 0 451 084 A2 | 10/1991 |
| WO | WO/96/11842 | 4/1996 |

* cited by examiner

*Primary Examiner*—Ninh H. Nguyen
(74) *Attorney, Agent, or Firm*—Edward F. Murphy, III

(57) ABSTRACT

A damper assembly including a spherical elastomer bearing member, wherein the spherical elastomer bearing member is operable for accommodating relative motion and/or vibration, and a flat elastomer bearing member, wherein the flat elastomer bearing member is operable for accommodating relative motion and/or vibration. The damper assembly also including a substantially rigid transition shim disposed between the spherical elastomer bearing member and the flat elastomer bearing member, wherein the substantially rigid transition shim is operable for coupling the spherical elastomer bearing member to the flat elastomer bearing member. The damper assembly further including a tension member attached to the substantially rigid transition shim, wherein the tension member is operable for precompressing the spherical elastomer bearing member and increasing the cocking stiffness of the damper assembly.

45 Claims, 4 Drawing Sheets

FLEXBEAM DAMPER ASSEMBLY HAVING TRANSITION SHIM CLAMP DEVICE

FIELD OF THE INVENTION

The present invention relates generally to a damper or elastomeric bearing assembly used to control motion and/or vibration in a mechanical system or the like. More specifically, the present invention relates to a flexbeam damper assembly having a transition shim clamp device. The flexbeam damper assembly of the present invention may be used to control, for example, lead-lag motion and/or vibration in the rotor blades of a rotary-wing aircraft or the like, while allowing flapping and/or pitching motion and/or vibration.

BACKGROUND OF THE INVENTION

The rotor blades of a rotary-wing aircraft or the like typically include a flexbeam member disposed concentrically within a torque tube, sometimes also referred to as a "pitch case". These flexbeam members and torque tubes may be displaced during operation, especially in relation to one another. Such displacement may include lead-lag motion and/or vibration having an arcuate reciprocating path in the plane of the flexbeam member about a central rotor assembly axis perpendicular to the axis of a given rotor blade, flapping motion and/or vibration in an arcuate reciprocating path about a chordwise axis of the central rotor assembly, linear motion and/or vibration in a linear reciprocating direction toward and away from the central rotor assembly along a radially-extending axis of the rotor blades, and pitching motion and/or vibration about a spanwise or radially-extending axis defined by the flexbeam member and/or a rotor blade. Of these motions and/or vibrations, lead-lag motion and/or vibration must be controlled, while flapping and/or pitching motion and/or vibration must be allowed to maintain safe, efficient, and controlled operation of the rotary-wing aircraft or the like.

The flexbeam member and the torque tube of a given rotor blade are typically coupled together using a flexbeam damper assembly, as will be described in greater detail herein. Such a flexbeam damper assembly may include, for example, both a spherical elastomer bearing member and a flat elastomer bearing member coupled together using a transition shim or the like. Preferably, the flat elastomer bearing member has a relatively high cocking stiffness relative to the spherical elastomer bearing member, causing the flat layer(s) of the flat elastomer bearing member to shear due to lead-lag motion, minimizing the tension and compression forces experienced by the flat layer(s). Such tension and compression forces may lead to fatigue and the eventual failure of the flat elastomer bearing member and/or the spherical elastomer bearing member. The spherical layer(s) of the spherical elastomer bearing member, on the other hand, are intended to be relatively low in cocking stiffness to provide relatively low rotor control forces. Thus, the spherical elastomer bearing member provides relatively low control forces.

The cocking stiffness of the flat elastomer bearing member and, accordingly, that seen by the transition shim due to radial loading may be increased by increasing the planar surface area of the flat layer(s) of the flat elastomer bearing member and/or decreasing the elastomer thickness per flat layer of the flat elastomer bearing member. Advantageously, increasing the cocking stiffness experienced by the transition shim due to radial loading limits a degree of freedom of the overall system and increases elastomer life. The measures described above, however, suffer from several drawbacks. Increasing the cocking stiffness of the flat layer(s) of the flat elastomer bearing member requires the use of very thin flat layers joined together using shims. This results in a flat elastomer bearing member with increased height and weight, and one that is prone to other fatigue-related problems, such as cavitation-type failures. Increasing the planar surface area of the flat layer(s) of the flat elastomer bearing member and/or decreasing the elastomer thickness per flat layer of the flat elastomer bearing member increases the size of the space envelope required. Thus, the measures described above are not practical given some applications.

Thus, what is needed are devices and methods that provide a flexbeam damper assembly having overall increased cocking stiffness due to radial loading, without the need for increasing the cocking stiffness and/or increasing the planar surface area of the flat layer(s) of the flat elastomer bearing member. What is also needed is a flexbeam damper assembly utilizing such devices and methods that is relatively simple and cost-effective to manufacture and maintain.

BRIEF DESCRIPTION OF THE INVENTION

The present invention provides a transition shim clamp device and associated methods that provide a flexbeam damper assembly having substantial precompression of the spherical layer(s) of the spherical elastomer bearing member and overall increased cocking stiffness due to radial loading, without the need for increasing the cocking stiffness and/or increasing the planar surface area of the flat layer(s) of the flat elastomer bearing member. This provides improved elastomer fatigue life in the layer(s) of both the spherical elastomer bearing member and the flat elastomer bearing member. Advantageously, a flexbeam damper assembly utilizing such a transition shim clamp device and associated methods is relatively simple and cost-effective to manufacture and maintain.

In one embodiment of the present invention, a damper assembly includes a spherical elastomer bearing member, wherein the spherical elastomer bearing member is operable for accommodating relative motion and/or vibration, and a flat elastomer bearing member, wherein the flat elastomer bearing member is operable for accommodating relative motion and/or vibration. The damper assembly also includes a substantially rigid transition shim disposed between the spherical elastomer bearing member and the flat elastomer bearing member, wherein the substantially rigid transition shim is operable for coupling the spherical elastomer bearing member to the flat elastomer bearing member. The damper assembly further includes a tension member attached to the substantially rigid transition shim, wherein the tension member is operable for precompressing the spherical elastomer bearing member and increasing the cocking stiffness of the damper assembly.

In another embodiment of the present invention, a damper assembly includes a spherical elastomer bearing member, wherein the spherical elastomer bearing member is operable for accommodating relative motion and/or vibration between a flexbeam member and a torque tube member of a rotor blade of a rotary-wing aircraft, and a flat elastomer bearing member, wherein the flat elastomer bearing member is operable for accommodating relative motion and/or vibration between a flexbeam member and a torque tube member of a rotor blade of a rotary-wing aircraft. The damper assembly also includes a substantially rigid transition shim disposed between the spherical elastomer bearing member and the flat elastomer bearing member, wherein the substantially rigid transition shim is operable for coupling the spherical elastomer bearing member to the flat elastomer bearing member. The damper assembly further includes a tension member attached to the substantially rigid transition shim, wherein the tension member is operable for precompressing the spherical elastomer bearing member and increasing the cocking stiffness of the damper assembly.

In a further embodiment of the present invention, a rotor blade of a rotary-wing aircraft includes a flexbeam member disposed concentrically within a torque tube member. The rotor blade also includes a spherical elastomer bearing member, wherein the spherical elastomer bearing member is operable for accommodating relative motion and/or vibration between the flexbeam member and the torque tube member, and a flat elastomer bearing member, wherein the flat elastomer bearing member is operable for accommodating relative motion and/or vibration between the flexbeam member and the torque tube member. The rotor blade further includes a substantially rigid transition shim disposed between the spherical elastomer bearing member and the flat elastomer bearing member, wherein the substantially rigid transition shim is operable for coupling the spherical elastomer bearing member to the flat elastomer bearing member. The rotor blade still further includes a tension member attached to the substantially rigid transition shim, wherein the tension member is operable for precompressing the spherical elastomer bearing member.

In a still further embodiment of the present invention, a method for damping relative motion and/or vibration between a flexbeam member and a torque tube member includes the steps of providing a spherical elastomer bearing member, wherein the spherical elastomer bearing member is operable for accommodating relative motion and/or vibration, and providing a flat elastomer bearing member, wherein the flat elastomer bearing member is operable for accommodating relative motion and/or vibration. The method also includes the step of disposing a substantially rigid transition shim between the spherical elastomer bearing member and the flat elastomer bearing member, wherein the substantially rigid transition shim is operable for coupling the spherical elastomer bearing member to the flat elastomer bearing member. The method further includes the step of attaching a tension member to the substantially rigid transition shim, wherein the tension member is operable for precompressing the spherical elastomer bearing member and increasing the cocking stiffness of the damper assembly.

BRIEF DESCRIPTION OF THE DRAWINGS

FIG. 2 is a cross-sectional side view of another embodiment of the flexbeam damper assembly of the present invention, highlighting the installation of the flexbeam damper assembly in the rotor blade of a rotary-wing aircraft or the like;

FIG. 3 is a cross-sectional side view of a further embodiment of the flexbeam damper assembly of the present invention, again highlighting the installation of the flexbeam damper assembly in the rotor blade of a rotary-wing aircraft or the like.

DETAILED DESCRIPTION OF THE INVENTION

Figure 1:
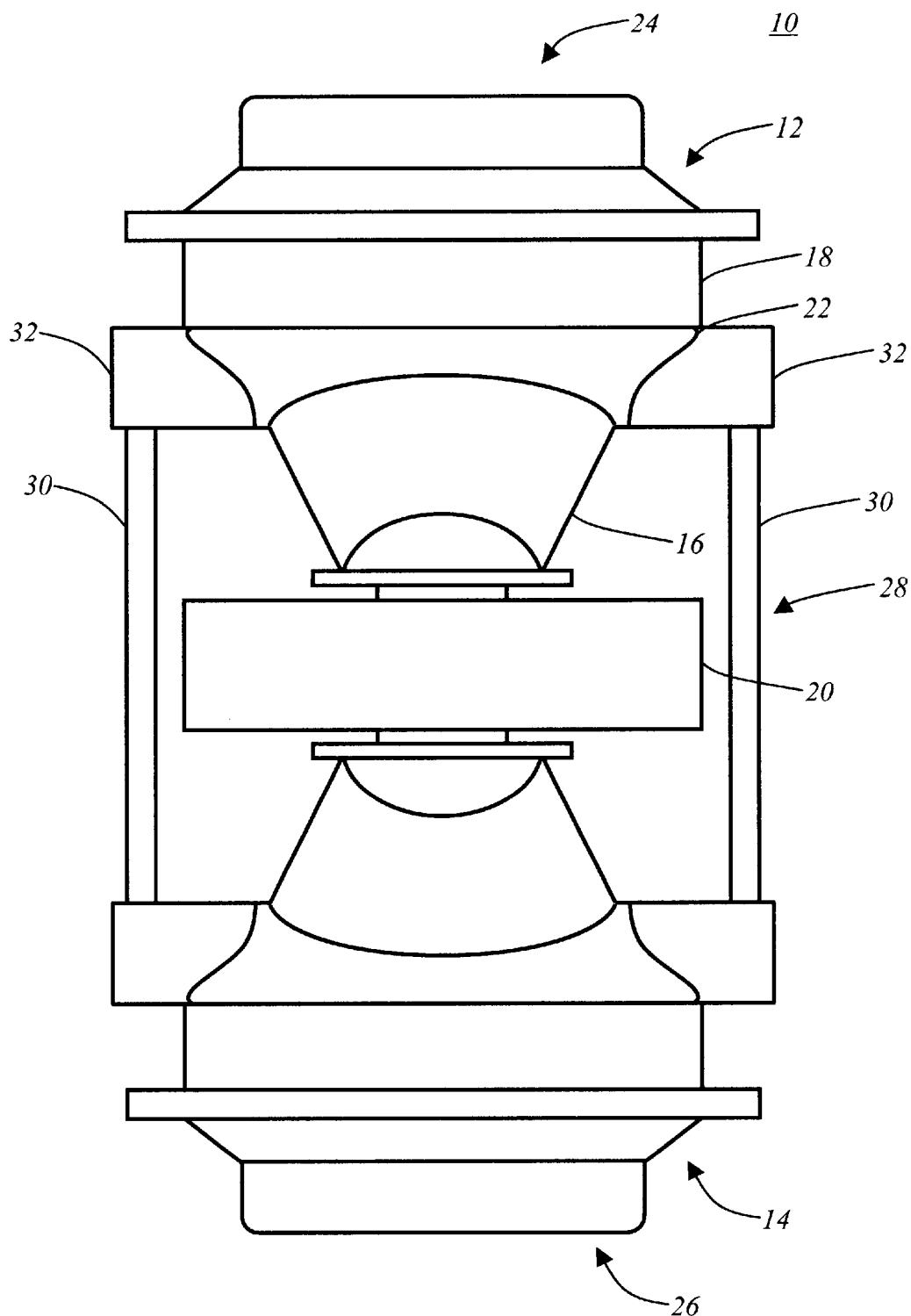
FIG. 1 is a cross-sectional side view of one embodiment of the flexbeam damper assembly of the present invention, the flexbeam damper assembly having a transition shim clamp device.

As described above, the rotor blades of a rotary-wing aircraft or the like typically include a flexbeam member disposed concentrically within a torque tube, sometimes also referred to as a "pitch case". These flexbeam members and torque tubes may be displaced during operation, especially in relation to one another. Such displacement may include lead-lag motion and/or vibration having an arcuate reciprocating path in the plane of the flexbeam member about a central rotor assembly axis perpendicular to the axis of a given rotor blade, flapping motion and/or vibration in an arcuate reciprocating path about a chordwise axis of the central rotor assembly, linear motion and/or vibration in a linear reciprocating direction toward and away from the central rotor assembly along a radially-extending axis of the rotor blades, and pitching motion and/or vibration about a spanwise or radially-extending axis defined by the flexbeam member and/or a rotor blade. Of these motions and/or vibrations, lead-lag motion and/or vibration must be controlled, while flapping and/or pitching motion and/or vibration must be allowed to maintain safe, efficient, and controlled operation of the rotary-wing aircraft or the like.

The flexbeam member and the torque tube of a given rotor blade are typically coupled together using a flexbeam damper assembly, as will be described in greater detail herein. Such a flexbeam damper assembly may include, for example, both a spherical elastomer bearing member and a flat elastomer bearing member coupled together using a transition shim or the like. Preferably, the flat elastomer bearing member has a relatively high cocking stiffness relative to the spherical elastomer bearing member, causing the flat layer(s) of the flat elastomer bearing member to shear due to lead-lag motion, minimizing the tension and compression forces experienced by the flat layer(s). Such tension and compression forces may lead to fatigue and the eventual failure of the flat elastomer bearing member and/or the spherical elastomer bearing member. The spherical layer(s) of the spherical elastomer bearing member, on the other hand, are intended to be relatively low in cocking stiffness to provide relatively low rotor control forces. Thus, the spherical elastomer bearing member provides relatively low control forces.

The cocking stiffness of the flat elastomer bearing member and, accordingly, that seen by the transition shim due to radial loading may be increased by increasing the planar surface area of the flat layer(s) of the flat elastomer bearing member and/or decreasing the elastomer thickness per flat layer of the flat elastomer bearing member. Advantageously, increasing the cocking stiffness experienced by the transition shim due to radial loading limits a degree of freedom of the overall system and increases elastomer life. The measures described above, however, suffer from several drawbacks. Increasing the cocking stiffness of the flat layer(s) of the flat elastomer bearing member requires the use of very thin flat layers joined together using shims. This results in a flat elastomer bearing member with increased height and weight, and one that is prone to other fatigue-related problems, such as cavitation-type failures. Increasing the planar surface area of the flat layer(s) of the flat elastomer bearing member and/or decreasing the elastomer thickness per flat layer of the flat elastomer bearing member increases the size of the space envelope required. Thus, the measures described above are not practical given some applications.

Referring to FIG. 1, in one embodiment of the present invention, the flexbeam damper assembly 10 includes an upper pivot damper assembly 12 (such as LORD part number LB9-1197-52-1) and a lower pivot damper assembly 14 (such as LORD part number LB9-1197-53-1). For present purposes, the upper pivot damper assembly 12 and the lower pivot damper assembly 14 may be assumed to be substantially identical. The pivot damper assemblies 12,14 each include a spherical elastomer bearing member 16 composed of one or more spherical elastomer layers (not shown) and one or more shims (not shown). Likewise, the pivot damper assemblies 12,14 each include a flat elastomer bearing member 18 composed of one or more flat elastomer layers (not shown) and one or more shims (not shown). Thus, the spherical elastomer bearing members 16 and the flat elastomer bearing members 18 represent conventional high-capacity laminate structures comprising a plurality of alternating elastomer and rigid (e.g., metal) layers. The spherical elastomer bearing members 16 are each fixedly attached (via a mechanical connection, bonding, or otherwise) to the flexbeam member 20 of the rotor blade (not shown) of a rotary-wing aircraft or the like. The spherical elastomer bearing members 16 are also each flexibly attached to their respective flat elastomer bearing members 14 via a transition shim 22, with both the spherical elasotmer bearing members 16 and the respective flat elastomer bearing members 14 being mechanically connected, bonded, or otherwise attached to the transition shim 22. Preferably, the transition shim 22 is made of a substantially rigid material, such as metal (e.g., chromic or sulfuric acid anodized aluminum), a composite material, or the like. The upper portion of the upper pivot damper assembly 12, consisting in part of an upper pivot damper housing 24, and the lower portion of the lower pivot damper assembly 14, consisting in part of a lower pivot damper housing 26, are each fixedly or flexibly attached to the torque tube (not shown in FIG. 1) of the rotor blade. The upper pivot damper housing 24 and the lower pivot damper housing 26 may be made of, for example, a metal, a composite material, or the like. Together, the spherical elastomer bearing members 16 and the flat elastomer bearing members 18 are operable for accommodating the relative motions and/or vibrations between the flexbeam member 20 and the torque tube described above.

The flexbeam damper assembly 10 of the present invention also includes a transition shim clamp device 28 consisting of a plurality of tension members 30 disposed between and connecting a plurality of substantially rigid flanges 32 associated with the transition shims 22. The plurality of tension members 30 are operable for pulling the transition shims 22 towards one another, precompressing the one or more spherical layers associated with the spherical elastomer bearing members 16 and increasing the overall cocking stiffness of the flexbeam bearing assembly 10 due to radial loading. The plurality of tension members 30 may include, for example, a plurality of rigid bars, straps, cables, wires, ropes, or other suitable tension members. In one exemplary embodiment of the present invention, the plurality of tension members 30 each comprise a single bar that is approximately 0.08 inches thick, 1.75 inches wide, and 8.00 inches long. In another exemplary embodiment of the present invention, the plurality of tension members 30 each comprise five (5) bars that are approximately 0.08 inches thick, 0.35 inches wide, and 8.00 inches long. These exemplary embodiments are not intended to be limiting.

Figure 2:
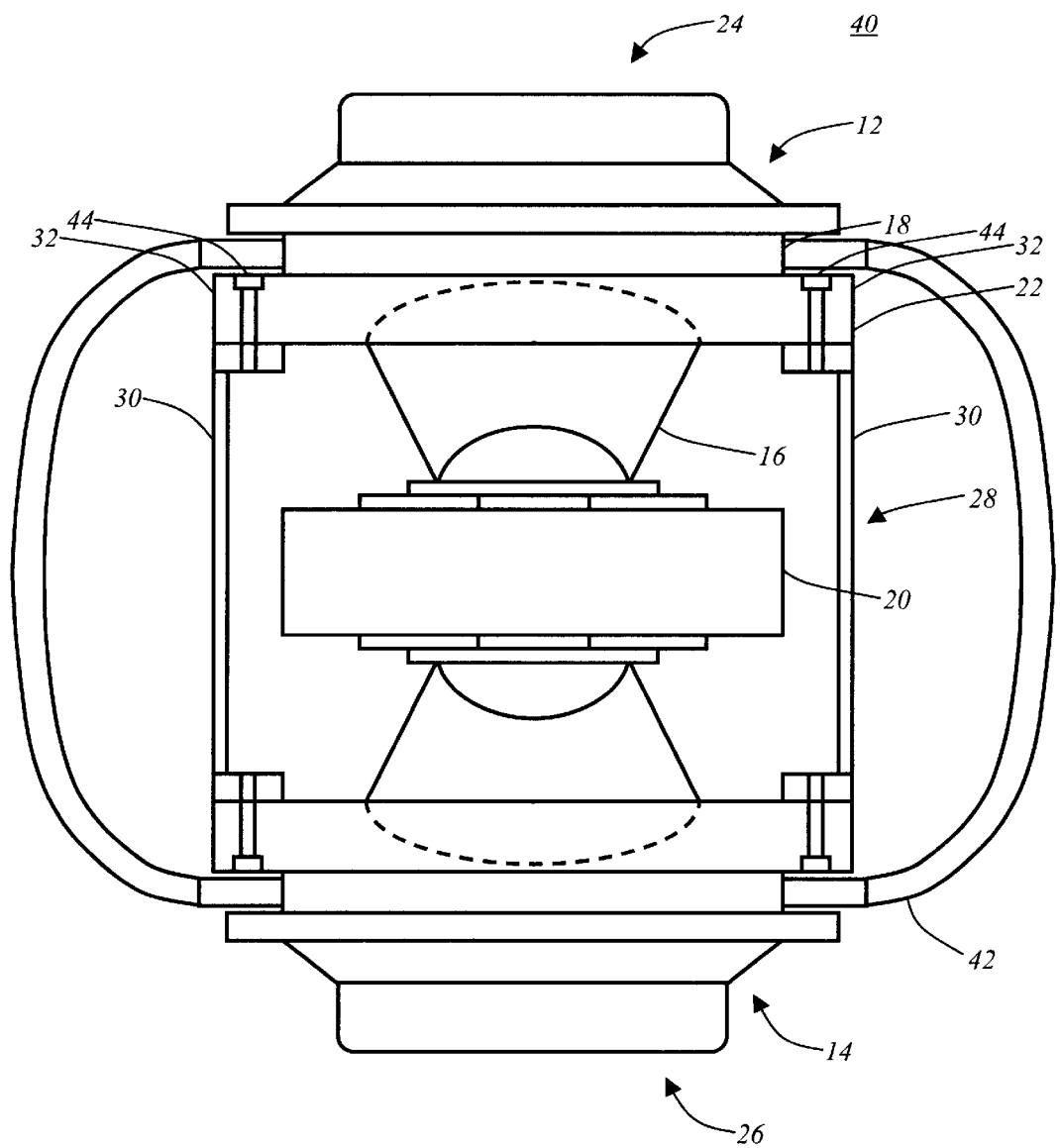

Referring to FIG. 2, in another embodiment of the present invention, the flexbeam damper assembly 40 again includes an upper pivot damper assembly 12 (such as LORD part number LB9-1197-52-1) and a lower pivot damper assembly 14 (such as LORD part number LB9-1197-53-1). For present purposes, the upper pivot damper assembly 12 and the lower pivot damper assembly 14 may be assumed to be substantially identical. The pivot damper assemblies 12,14 each include a spherical elastomer bearing member 16 composed of one or more spherical elastomer layers (not shown) and one or more shims (not shown). The outer surface of each of the spherical elastomer bearing members may have a slope of approximately 14 degrees, however other suitable slopes may be used. Likewise, the pivot damper assemblies 12,14 each include a flat elastomer bearing member 18 composed of one or more flat elastomer layers (not shown) and one or more shims (not shown). The spherical elastomer bearing members 16 are each fixedly attached (via a mechanical connection, bonding, or otherwise) to the flexbeam member 20 of the rotor blade (not shown) of a rotary-wing aircraft or the like. The spherical elastomer bearing members 16 are also each flexibly attached to their respective flat elastomer bearing members 14 via a transition shim 22, with both the spherical elasotmer bearing members 16 and the respective flat elastomer bearing members 14 being mechanically connected, bonded, or otherwise attached to the transition shim 22. The upper portion 24 of the upper pivot damper assembly 12 and the lower portion 26 of the lower pivot damper assembly 14 are each fixedly or flexibly attached to the torque tube 42 of the rotor blade. Together, the spherical elastomer bearing members 16 and the flat elastomer bearing members 18 are operable for accommodating the relative motions and/or vibrations between the flexbeam member 20 and the torque tube 42 described above.

The flexbeam damper assembly 40 of the present invention also includes a transition shim clamp device 28 consisting of a plurality of tension members 30 disposed between and connecting a plurality of substantially rigid flanges 32 associated with the transition shims 22. The plurality of tension members 30 are operable for pulling the transition shims 22 towards one another, precompressing the one or more spherical layers associated with the spherical elastomer bearing members 16 and increasing the overall cocking stiffness of the flexbeam bearing assembly 40 due to radial loading. Again, the plurality of tension members 30 may include, for example, a plurality of rigid bars, straps, cables, wires, ropes, or other suitable tension members. The plurality of tension members 30 may be bolted (via a plurality of bolts 44), bonded, or otherwise fixedly attached to the plurality of substantially rigid flanges 32 associated with the transition shims 22.

Figure 3:
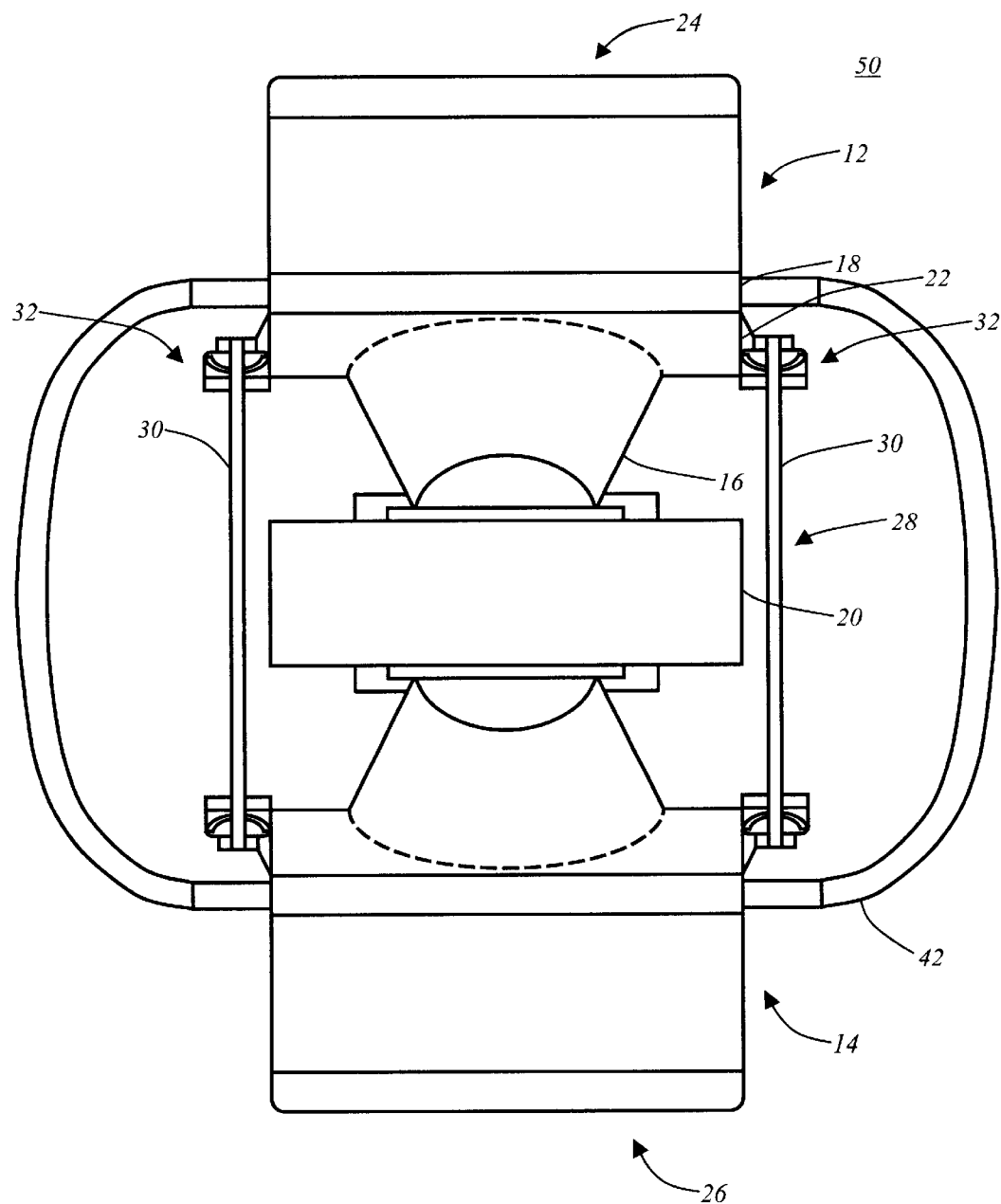

Referring to FIG. 3, in a further embodiment of the present invention, the flexbeam damper assembly 50 again includes an upper pivot damper assembly 12 (such as LORD part number LB9-1197-52-1) and a lower pivot damper assembly 14 (such as LORD part number LB9-1197-53-1). For present purposes, the upper pivot damper assembly 12 and the lower pivot damper assembly 14 may be assumed to be substantially identical. The pivot damper assemblies 12,14 each include a spherical elastomer bearing member 16 composed of one or more spherical elastomer layers (not shown) and one or more shims (not shown). Likewise, the pivot damper assemblies 12,14 each include a flat elastomer bearing member 18 composed of one or more flat elastomer layers (not shown) and one or more shims (not shown). The spherical elastomer bearing members 16 are each fixedly attached (via a mechanical connection, bonding, or otherwise) to the flexbeam member 20 of the rotor blade (not shown) of a rotary-wing aircraft or the like. The spherical elastomer bearing members 16 are also each flexibly attached to their respective flat elastomer bearing members 14 via a transition shim 22, with both the spherical elasotmer bearing members 16 and the respective flat elastomer bearing members 14 being mechanically connected, bonded, or otherwise attached to the transition shim 22. The upper portion 24 of the upper pivot damper assembly 12 and the lower portion 26 of the lower pivot damper assembly 14 are each fixedly or flexibly attached to the torque tube 42 of the rotor blade. Together, the spherical elastomer bearing members 16 and the flat elastomer bearing members 18 are operable for accommodating the relative motions and/or vibrations between the flexbeam member 20 and the torque tube 42 described above.

The flexbeam damper assembly 50 of the present invention also includes a transition shim clamp device 28 consisting of a plurality of tension members 30 disposed between and connecting a plurality of substantially rigid flanges 32 associated with the transition shims 22. The plurality of tension members 30 are operable for pulling the transition shims 22 towards one another, precompressing the one or more spherical layers associated with the spherical elastomer bearing members 16 and increasing the overall cocking stiffness of the flexbeam bearing assembly 50 due to radial loading. Again, the plurality of tension members 30 may include, for example, a plurality of rigid bars, straps, cables, wires, ropes, or other suitable tension members. The plurality of tension members 30 may be bolted, bonded, or otherwise fixedly attached to the plurality of substantially rigid flanges 32 associated with the transition shims 22.

Figure 4:
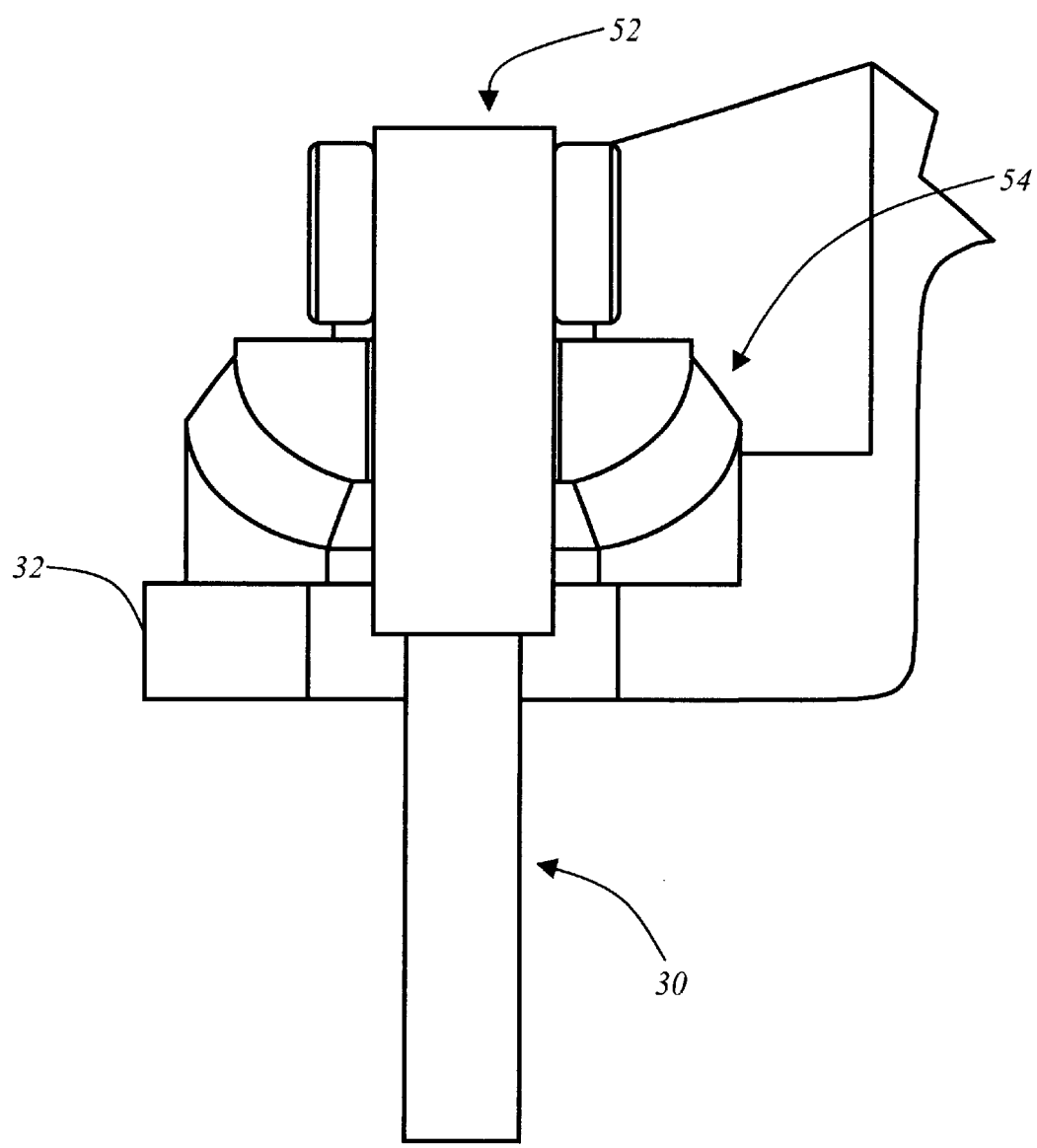
FIG. 4 is a cross-sectional side view of one embodiment of a spherical elastomer bearing member associated with the transition shim clamp device used by the flexbeam damper assembly of the present invention.

Referring to FIG. 4, in an alternative embodiment of the present invention, the end portions 52 of the plurality of tension members 30 may be disposed within and through a plurality of pivoting members 54, such as a plurality of additional spherical elastomer bearing members composed of one or more spherical elastomer layers (not shown) and, optionally, one or more shims (not shown), a plurality of pivoting bearings or joints, a plurality of linear hinges or rod ends, or a plurality of other pivoting mechanisms. As is shown in FIG. 4, each of these pivoting members 54 may be disposed adjacent to and fixedly or flexibly attached to one of the outward-extending substantially rigid flanges 32 associated with the transition shims 22. Advantageously, this configuration reduces the stresses experienced by the plurality of tension members 30, as the pivoting members 54 accommodate shear motion by pivoting. In this embodiment of the present invention, each of the plurality of tension members 30 may be, for example, a rigid bar having a diameter of approximately 0.25 inches.

Although the assemblies, devices, and methods of the present invention have been shown and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A damper assembly, comprising:
  a spherical elastomer bearing member, wherein the spherical elastomer bearing member is operable for accommodating relative motion and/or vibration;
  a flat elastomer bearing member, wherein the flat elastomer bearing member is operable for accommodating relative motion and/or vibration;
  a substantially rigid transition shim disposed between the spherical elastomer bearing member and the flat elastomer bearing member, wherein the substantially rigid transition shim is operable for coupling the spherical elastomer bearing member to the flat elastomer bearing member; and
  a tension member attached to the substantially rigid transition shim, wherein the tension member is operable for precompressing the spherical elastomer bearing member and increasing the cocking stiffness of the damper assembly.

2. The damper assembly of claim 1, wherein the spherical elastomer bearing member comprises one or more spherical elastomer layers.

3. The damper assembly of claim 2, wherein the spherical elastomer bearing member further comprises one or more substantially rigid spherical shims.

4. The damper assembly of claim 3, wherein the one or more spherical elastomer layers are disposed adjacent to the one or more substantially rigid spherical shims in an alternating fashion, and wherein the one or more spherical elastomer layers are bonded to the one or more substantially rigid spherical shims forming a laminate.

5. The damper assembly of claim 1, wherein the flat elastomer bearing member comprises one or more flat elastomer layers.

6. The damper assembly of claim 5, wherein the flat elastomer bearing member further comprises one or more substantially rigid flat shims.

7. The damper assembly of claim 6, wherein the one or more flat elastomer layers are disposed adjacent to the one or more substantially rigid flat shims in an alternating fashion, and wherein the one or more flat elastomer layers are bonded to the one or more substantially rigid flat shims forming a laminate.

8. The damper assembly of claim 1, wherein the substantially rigid transition shim comprises a flange.

9. The damper assembly of claim 8, wherein the tension member is attached to the flange of the substantially rigid transition shim.

10. The damper assembly of claim 1, wherein the tension member comprises a tension member selected from the group consisting of a rigid bar, a strap, a cable, a wire, and a rope.

11. The damper assembly of claim 1, further comprising a pivoting member operable for attaching the tension member to the substantially rigid transition shim, wherein the pivoting member allows the tension member to pivot with respect to the substantially rigid transition shim.

12. The damper assembly of claim 1, further comprising a damper assembly housing.

13. The damper assembly of claim 12, wherein the damper assembly housing is fixedly or flexibly attached to a torque tube member.

14. The damper assembly of claim 1, wherein the spherical elastomer bearing member is fixedly or flexibly attached to a flexbeam member.

15. A damper assembly, comprising:
  a spherical elastomer bearing member, wherein the spherical elastomer bearing member is operable for accommodating relative motion and/or vibration between a flexbeam member and a torque tube member of a rotor blade of a rotary-wing aircraft;
  a flat elastomer bearing member, wherein the flat elastomer bearing member is operable for accommodating relative motion and/or vibration between a flexbeam member and a torque tube member of a rotor blade of a rotary-wing aircraft;

a substantially rigid transition shim disposed between the spherical elastomer bearing member and the flat elastomer bearing member, wherein the substantially rigid transition shim is operable for coupling the spherical elastomer bearing member to the flat elastomer bearing member; and a tension member attached to the substantially rigid transition shim, wherein the tension member is operable for precompressing the spherical elastomer bearing member and increasing the cocking stiffness of the damper assembly.

16. The damper assembly of claim 15, wherein the spherical elastomer bearing member comprises one or more spherical elastomer layers.

17. The damper assembly of claim 16, wherein the spherical elastomer bearing member further comprises one or more substantially rigid spherical shims.

18. The damper assembly of claim 17, wherein the one or more spherical elastomer layers are disposed adjacent to the one or more substantially rigid spherical shims in an alternating fashion, and wherein the one or more spherical elastomer layers are bonded to the one or more substantially rigid spherical shims forming a laminate.

19. The damper assembly of claim 15, wherein the flat elastomer bearing member comprises one or more flat elastomer layers.

20. The damper assembly of claim 19, wherein the flat elastomer bearing member further comprises one or more substantially rigid flat shims.

21. The damper assembly of claim 20, wherein the one or more flat elastomer layers are disposed adjacent to the one or more substantially rigid flat shims in an alternating fashion, and wherein the one or more flat elastomer layers are bonded to the one or more substantially rigid flat shims forming a laminate.

22. The damper assembly of claim 15, wherein the substantially rigid transition shim comprises a flange.

23. The damper assembly of claim 22, wherein the tension member is attached to the flange of the substantially rigid transition shim.

24. The damper assembly of claim 15, wherein the tension member comprises a tension member selected from the group consisting of a rigid bar, a strap, a cable, a wire, and a rope.

25. The damper assembly of claim 15, further comprising a pivoting member operable for attaching the tension member to the substantially rigid transition shim, wherein the pivoting member allows the tension member to pivot with respect to the substantially rigid transition shim.

26. The damper assembly of claim 15, further comprising a damper assembly housing.

27. The damper assembly of claim 26, wherein the damper assembly housing is fixedly or flexibly attached to the torque tube member.

28. The damper assembly of claim 15, wherein the spherical elastomer bearing member is fixedly or flexibly attached to the flexbeam member.

29. A rotor blade of a rotary-wing aircraft, comprising:
a flexbeam member disposed concentrically within a torque tube member;
a spherical elastomer bearing member, wherein the spherical elastomer bearing member is operable for accommodating relative motion and/or vibration between the flexbeam member and the torque tube member;
a flat elastomer bearing member, wherein the flat elastomer bearing member is operable for accommodating relative motion and/or vibration between the flexbeam member and the torque tube member;
a substantially rigid transition shim disposed between the spherical elastomer bearing member and the flat elastomer bearing member, wherein the substantially rigid transition shim is operable for coupling the spherical elastomer bearing member to the flat elastomer bearing member; and
a tension member attached to the substantially rigid transition shim, wherein the tension member is operable for precompressing the spherical elastomer bearing member.

30. The rotor blade of claim 29, wherein the spherical elastomer bearing member comprises one or more spherical elastomer layers.

31. The rotor blade of claim 30, wherein the spherical elastomer bearing member further comprises one or more substantially rigid spherical shims.

32. The rotor blade of claim 31, wherein the one or more spherical elastomer layers are disposed adjacent to the one or more substantially rigid spherical shims in an alternating fashion, and wherein the one or more spherical elastomer layers are bonded to the one or more substantially rigid spherical shims forming a laminate.

33. The rotor blade of claim 29, wherein the flat elastomer bearing member comprises one or more flat elastomer layers.

34. The rotor blade of claim 33, wherein the flat elastomer bearing member further comprises one or more substantially rigid flat shims.

35. The rotor blade of claim 34, wherein the one or more flat elastomer layers are disposed adjacent to the one or more substantially rigid flat shims in an alternating fashion, and wherein the one or more flat elastomer layers are bonded to the one or more substantially rigid flat shims forming a laminate.

36. The rotor blade of claim 29, wherein the substantially rigid transition shim comprises a flange.

37. The rotor blade of claim 36, wherein the tension member is attached to the flange of the substantially rigid transition shim.

38. The rotor blade of claim 29, wherein the tension member comprises a tension member selected from the group consisting of a rigid bar, a strap, a cable, a wire, and a rope.

39. The rotor blade of claim 29, further comprising a pivoting member operable for attaching the tension member to the substantially rigid transition shim, wherein the pivoting member allows the tension member to pivot with respect to the substantially rigid transition shim.

40. The rotor blade of claim 29, further comprising a damper assembly housing.

41. The rotor blade of claim 40, wherein the damper assembly housing is fixedly or flexibly attached to the torque tube member.

42. The rotor blade of claim 29, wherein the spherical elastomer bearing member is fixedly or flexibly attached to the flexbeam member.

43. A method for damping relative motion and/or vibration between a flexbeam member and a torque tube member, comprising the steps of:
providing a spherical elastomer bearing member, wherein the spherical elastomer bearing member is operable for accommodating relative motion and/or vibration;
providing a flat elastomer bearing member, wherein the flat elastomer bearing member is operable for accommodating relative motion and/or vibration;

disposing a substantially rigid transition shim between the spherical elastomer bearing member and the flat elastomer bearing member, wherein the substantially rigid transition shim is operable for coupling the spherical elastomer bearing member to the flat elastomer bearing member; and attaching a tension member to the substantially rigid transition shim, wherein the tension member is operable for precompressing the spherical elastomer bearing member and increasing the cocking stiffness of the damper assembly.

44. The method of claim 43, wherein the tension member comprises a tension member selected from the group consisting of a rigid bar, a strap, a cable, a wire, and a rope.

45. The method of claim 43, further comprising providing a pivoting member operable for attaching the tension member to the substantially rigid transition shim, wherein the pivoting member allows the tension member to pivot with respect to the substantially rigid transition shim.

* * * * *